US010645579B2

(12) United States Patent
Jiang et al.

(10) Patent No.: US 10,645,579 B2
(45) Date of Patent: *May 5, 2020

(54) ACCOUNT LOGIN METHOD, APPARATUS, AND SYSTEM

(71) Applicant: Tencent Technology (Shenzhen) Company Limited, Shenzhen, Guangdong (CN)

(72) Inventors: Ningbo Jiang, Shenzhen (CN); Qinglei Feng, Shenzhen (CN); Zheng Jiang, Shenzhen (CN); Lei Qin, Shenzhen (CN); Jiwei Guo, Shenzhen (CN); Jie Zhao, Shenzhen (CN); Jun Ma, Shenzhen (CN); Siwei Zhou, Shenzhen (CN); Xing Chen, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,591

(22) Filed: May 26, 2018

(65) Prior Publication Data

US 2018/0279127 A1 Sep. 27, 2018

Related U.S. Application Data

(63) Continuation of application No. 15/203,754, filed on Jul. 6, 2016, now Pat. No. 10,009,767, which is a
(Continued)

(30) Foreign Application Priority Data

Apr. 30, 2014 (CN) .......................... 2014 1 0182884

(51) Int. Cl.
*H04W 12/06* (2009.01)
*H04L 29/06* (2006.01)
(Continued)

(52) U.S. Cl.
CPC ............. *H04W 12/06* (2013.01); *H04L 67/42* (2013.01); *H04W 4/14* (2013.01); *H04W 12/08* (2013.01); *H04W 12/00522* (2019.01)

(58) Field of Classification Search
CPC ..... H04W 12/06; H04W 12/08; H04W 4/008; H04W 4/14; H04L 63/18; H04L 63/0853;
(Continued)

(56) References Cited

U.S. PATENT DOCUMENTS 8,627,438 B1 * 1/2014 Bhimanaik ............. H04L 63/10
726/9
10,110,578 B1 * 10/2018 Baer ....................... H04L 63/08
(Continued)

FOREIGN PATENT DOCUMENTS

CN 101087193 A 12/2007
CN 102957706 A 3/2013
(Continued)

OTHER PUBLICATIONS

International Search Report for App. No. PCT/CN2015/078433 dated Jul. 27, 2015.
(Continued)

*Primary Examiner* — George Eng
*Assistant Examiner* — Umair Ahsan
(74) *Attorney, Agent, or Firm* — Harness, Dickey & Pierce, P.L.C.

(57) ABSTRACT

An account login method includes receiving a login request command sent by a second terminal, the login request command carrying an account and a second terminal identifier. The method further includes detecting whether a device lock flag corresponding to the account is unlocked and that a state corresponding to the second terminal identifier is that a device lock is locked. If yes, the method further includes acquiring a first terminal identifier corresponding to
(Continued)

the account, a state corresponding to the first terminal identifier being that the device lock is unlocked and implementing a login of the account on the second terminal by using a first terminal corresponding to the first terminal identifier.

15 Claims, 10 Drawing Sheets

Related U.S. Application Data continuation of application No. PCT/CN2015/078433, filed on May 7, 2015.

(51) Int. Cl.
*H04W 4/14* (2009.01)
*H04W 12/08* (2009.01)
*H04W 12/00* (2009.01)

(58) Field of Classification Search
CPC ... H04L 63/0428; H04L 63/08; H04L 63/083; H04L 63/0869; H04L 63/0876; H04L 63/10; H04L 63/168; H04L 67/14; H04L 67/42; H04L 9/3226; G06F 21/36; G06K 19/06037; G06K 2019/06253; G06Q 20/3274; G06Q 20/38215; G06Q 20/3829; G06Q 20/40; H04M 15/47
See application file for complete search history.

(56) References Cited

U.S. PATENT DOCUMENTS

| | | | |
|---|---|---|---|
| 2012/0204247 A1* | 8/2012 | Leahy | G06F 21/36 726/7 |
| 2013/0067243 A1* | 3/2013 | Tamayo-Rios | G06F 21/44 713/193 |
| 2014/0325628 A1* | 10/2014 | Huang | H04L 63/0853 726/7 |
| 2015/0222615 A1* | 8/2015 | Allain | H04L 63/08 726/4 |
| 2016/0132883 A1* | 5/2016 | Evans | G06Q 20/10 705/44 |
| 2016/0255078 A1* | 9/2016 | Zhang | H04L 63/18 726/4 |
| 2016/0314462 A1* | 10/2016 | Hong | G09C 5/00 |
| 2016/0330710 A1* | 11/2016 | Liu | H04W 24/02 |

FOREIGN PATENT DOCUMENTS

| | | |
|---|---|---|
| CN | 103095659 A | 5/2013 |
| CN | 103685311 A | 3/2014 |
| CN | 103825863 A | 5/2014 |
| CN | 103905399 A | 7/2014 |
| CN | 104125062 A | 10/2014 |
| KR | 20100066811 A | 6/2010 |
| TW | 201328281 A | 7/2013 |

OTHER PUBLICATIONS

International Preliminary Report for App. No. PCT/CN2015/078433 dated Nov. 1, 2016.

* cited by examiner

ACCOUNT LOGIN METHOD, APPARATUS, AND SYSTEM

CROSS-REFERENCE TO RELATED APPLICATIONS

This application is a continuation of U.S. application Ser. No. 15/203,754, filed on Jul. 6, 2016, which is a continuation of International Application No. PCT/CN2015/078433, filed on May 7, 2015. This application claims the benefit and priority of Chinese Application No. 201410182884.7, filed on Apr. 30, 2014. The entire disclosures of each of the above applications are incorporated herein by reference.

FIELD

The present disclosure relates to computer technologies and to an account login method, apparatus, and system.

BACKGROUND

This section provides background information related to the present disclosure which is not necessarily prior art.

With the development of the Internet, accounts may be stolen in many ways, for example, through the insertion of a Trojan horse or phishing. As a result, a large number of users are subject to various liabilities such as fraud and harassment after accounts are stolen.

To lower the probability that an account is stolen, in a conventional account login method, a server usually determines, according to a behavior model of a user, whether a login device of the user is a commonly used device. For example, if an account is logged into a device for several consecutive days, or normal operations (for example, reception and sending of information) take place each time when an account is logged into device, it is determined that the device is a commonly used device on which the account is logged into. If the server detects that the account is not logged into the commonly used device, a barrier is set up for a login of the account.

In the conventional account login method, although a barrier for a login of an account is set up, it cannot be determined whether a user that logs into the account is an account thief, and therefore, a login cannot be completely restricted. Moreover, it is also possible for an account thief to impersonate a normal user to bypass determination of a server. Therefore, security of the conventional account login method is not sufficiently secure.

SUMMARY

This section provides a general summary of the disclosure, and is not a comprehensive disclosure of its full scope or all of its features.

An account login method includes:

receiving a login request command sent by a second terminal, the login request command carrying an account and a second terminal identifier;

detecting whether a device lock flag corresponding to the account is unlocked and that the state corresponding to the second terminal identifier is that a device lock flag is locked, and if yes, acquiring a first terminal identifier corresponding to the account, a state corresponding to the first terminal identifier being that the device lock is unlocked; and implementing a login of the account on the second terminal by using a first terminal corresponding to the first terminal identifier.

An account login method includes:

receiving, by a login authentication server, a login request command sent by a second terminal, the login request command carrying an account and a second terminal identifier;

detecting, by the login authentication server, whether a device lock flag, corresponding to the account, stored in an information management server is unlocked and that a state corresponding to the second terminal identifier is that a device lock is locked, and if yes, acquiring a first terminal identifier corresponding to the account, a state corresponding to the first terminal identifier being that the device lock is unlocked; and implementing, by the login authentication server, a login of the account on the second terminal by using a first terminal corresponding to the first terminal identifier.

An account login apparatus includes:

a receiving module, configured to receive a login request command sent by a second terminal, the login request command carrying an account and a second terminal identifier;

a detection module, configured to detect whether a device lock flag corresponding to the account is unlocked and that a state corresponding to the second terminal identifier is that a device lock is locked;

a login implementation module, configured to acquire, if the device lock flag corresponding to the account is unlocked and the state corresponding to the second terminal identifier is that the device lock is locked, a first terminal identifier corresponding to the account, a state corresponding to the first terminal identifier being that the device lock is unlocked, and implement a login of the account on the second terminal by using a first terminal corresponding to the first terminal identifier.

Further areas of applicability will become apparent from the description provided herein. The description and various examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To make the goals, technical methods, and benefits of the present disclosure more comprehensible, the present disclosure is described in further detail below with reference to the accompanying drawings and embodiments. It will be understood by those skilled in the art that the various embodiments described herein are merely used for describing the present disclosure rather than to limit the present disclosure.

Figure 1:
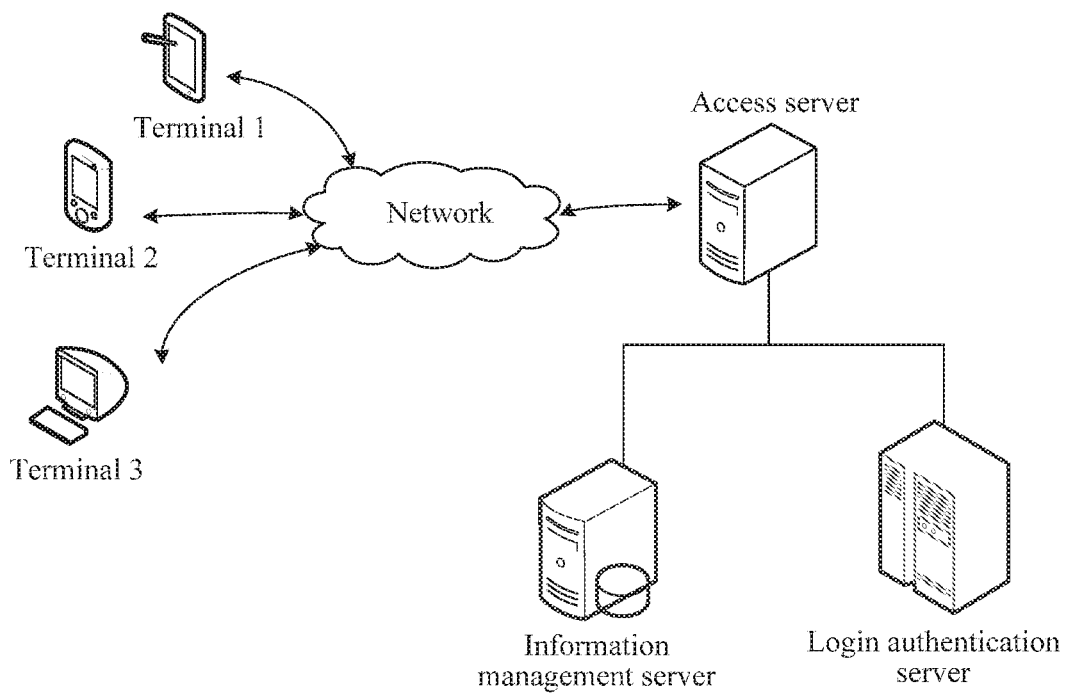
FIG. 1 is a diagram of an application environment of an account login method according to various embodiments.

An account login method provided in the embodiments of the present disclosure may be applied to a system shown in FIG. 1. In FIG. 1, the system includes various terminals and an access server, an information management server, and a login authentication server that interact with the terminals. The terminal establishes a connection to the access server through a network, uploads data to the access server, and receives data delivered by the access server. The access server is used for forwarding, to the information management server or the login authentication server, the data uploaded by the terminal, and forwarding, to the terminal, the data sent by the information management server or the login authentication server. It will be understood by one skilled in the art that the access server may be omitted. That is, the terminal directly sends the data to the information management server or the login authentication server through the network. Functions of the information management server and the login authentication server may also be integrated into a same server for implementation. The terminal includes, but is not limited to, a desktop computer, a laptop portable computer, a personal digital assistant, a tablet computer, a smartphone, an electronic reader, a moving picture experts group audio layer III (MP3) player, or a moving picture experts group audio layer IV (MP4) player on which an application program can run. The application program running on the terminal is normally used after a login of an account. For example, an account and a password need to be authenticated, and a login can only be implemented after authentication succeeds.

The information management server stores device lock information, including a device lock state corresponding to an account, a terminal identifier corresponding to an account, and a state corresponding to a terminal identifier. The device lock state includes two states, being unlocked and being locked. When a terminal unlocks a device lock, a device lock unlocking command carrying an account is sent to the information management server by using the access server, and the information management server sets a device lock state corresponding to the account to be unlocked. If a terminal unlocks a device lock, a state, corresponding to a terminal identifier, stored in the information management server, is that the device lock is unlocked, and otherwise, the state corresponding to the terminal identifier is that the device lock is locked. When a terminal requests a login to an application program, the login authentication server performs authentication. If the device lock is unlocked on the terminal, the login authentication server directly determines that authentication succeeds. If the device lock is locked on the terminal and a device lock flag corresponding to an account requesting a login is unlocked (that is, the device lock is unlocked by using another terminal), the login authentication server detects the device lock information in the information management server, a terminal on which the device lock is unlocked is obtained, and a login of the account is implemented, by using the terminal on which the device lock is unlocked, on the terminal on which the device lock is locked.

Figure 2:
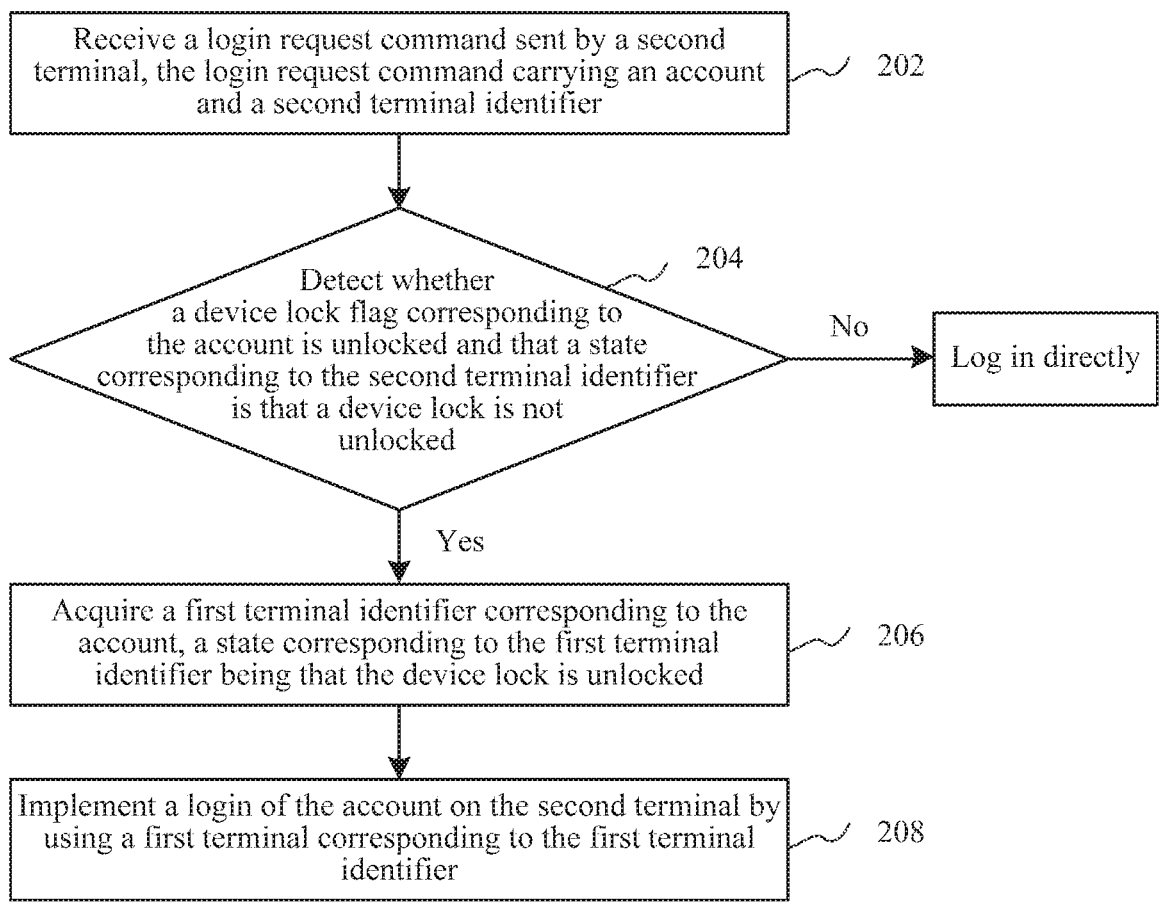
FIG. 2 is a flowchart of an account login method according to various embodiments.

As shown in FIG. 2, in various embodiments, an account login method is provided and described through an example in which the method is applied to a server side. The method includes the following.

Block 202: Receive a login request command sent by a second terminal, the login request command carrying an account and a second terminal identifier.

Block 204: Detect whether a device lock flag corresponding to the account is unlocked and that a state corresponding to the second terminal identifier is that a device lock is locked. If yes, perform block 206, otherwise, log in directly.

Block 206: Acquire a first terminal identifier corresponding to the account, a state corresponding to the first terminal identifier being that the device lock is unlocked.

Block 208: Implement a login of the account on the second terminal by using a first terminal corresponding to the first terminal identifier. In various embodiments, the first terminal is a terminal on which the device lock is unlocked, and therefore, the state corresponding to the first terminal identifier is that the device lock is unlocked. The second terminal is a terminal on which the device lock is locked, and therefore, the state corresponding to the second terminal identifier is that the device lock is locked. A terminal identifier is used for uniquely identifying one terminal. For different types of terminals, terminal identifiers of the terminals may differ. For example, for a smartphone, a terminal identifier may be a character string formed by information, such as a mobile number, a MAC address, and an International Mobile Station Equipment Identity (IMEI). For a personal computer (PC), a terminal identifier may be a character string formed by information, such as a MAC address and a hard disk sequence number. The terminal identifier is not limited to the two forms, as long as the terminal identifier can uniquely identify a terminal.

A device lock is used for locking an account by using a device, the first terminal on which the device lock is unlocked refers to a trusted device, and the second terminal on which the device lock is locked refers to an untrusted device. The same application program may run on the first terminal and the second terminal, that is, an application program may be logged into the first terminal by using an account, and the application program may also be logged into the second terminal by using the account. For example, the same instant messaging software may be logged into the first terminal, and may be logged into the second terminal by using a same account.

In various embodiments, the first terminal logs into the application program by using the account, and the device lock is unlocked. Therefore, the device lock flag corresponding to the account is unlocked. When the second terminal logs into the same application program by using the account or in a webpage form, it is detected that the device lock flag corresponding to the account is unlocked and the state corresponding to the second terminal identifier is that the device lock is locked, indicating that the account is locked by a device and the second terminal requesting a login is not a trusted device, and the first terminal identifier is obtained, thereby implementing a login of the account on the second terminal by using the first terminal that is used as the trusted device. It may be that the first terminal participates in an authentication process of the second terminal, so as to ensure that a user using the second terminal is also a user using the first terminal.

In various embodiments, it is identified by using a device lock flag whether a device lock is unlocked for an account. When a second terminal requests a login to the account, if the device lock is unlocked for the account, and the device lock is locked on the second terminal requesting a login to the account (that is, the second terminal is an untrusted device), a login of the account needs to be implemented on the second terminal by using the first terminal (that is, the first terminal is a trusted device) on which the device lock is unlocked, which ensures that a login of an account can only be implemented on an untrusted device by using a trusted device, and ensures that a user using the untrusted device is the same as a user using the trusted device, thereby improving security.

Figure 3:
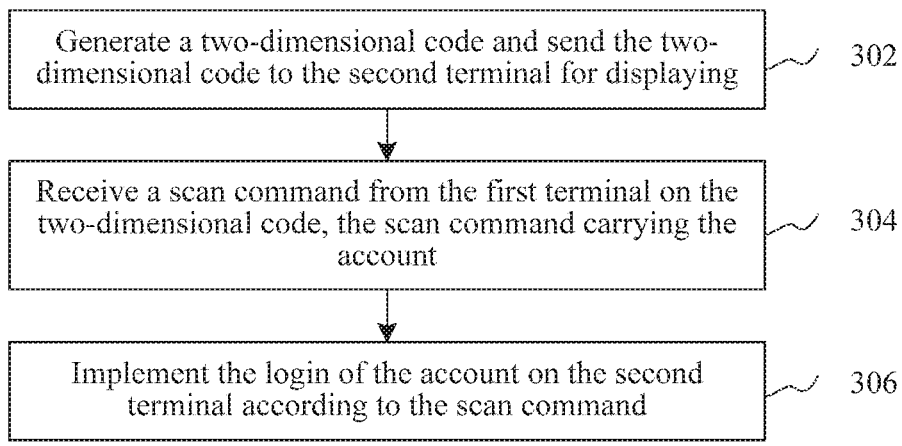
FIG. 3 is a flowchart of implementing a login of an account on a second terminal by using a first terminal according to various embodiments.

In various embodiments, as shown in FIG. 3, the method of implementing a login of the account on the second terminal by using a first terminal corresponding to the first terminal identifier in block 208 includes the following.

Block 302: Generate a two-dimensional code and send the two-dimensional code to the second terminal for displaying.

Block 304: Receive a scan command from the first terminal on the two-dimensional code, the scan command carrying the account.

Block 306: Implement the login of the account on the second terminal according to the scan command. In various embodiments, when the server detects that the device lock flag corresponding to the account is unlocked, and the device lock is locked on the second terminal requesting a login (that is, the second terminal is an untrusted device), the two-dimensional code is generated, where the two-dimensional code stores an automatically generated unique random number (key). The two-dimensional code is sent to the second terminal, and is displayed on the second terminal by using a login interface.

The first terminal needs to first log in by using the account, and when scanning the two-dimensional code displayed on the second terminal, the first terminal can acquire the account and send the account and the scan command to the server together. The first terminal logs into an application program by using the account, starts scanning the two-dimensional code by using the application program, collects a two-dimensional code image displayed on the second terminal, and obtains a unique random number in the two-dimensional code image by scanning, and the first terminal then sends the obtained unique random number and the account to the server together. The server detects whether the received unique random number is the same as the unique random number that was automatically generated before. If the received unique random number is the same as the unique random number that was automatically generated before, authentication succeeds, and the second terminal successfully logs in by using the account.

In various embodiments, a login of an account can only be implemented on a second terminal when a first terminal logs into an application program and scans a two-dimensional code on the second terminal, which ensures that a user using the second terminal is a user using the first terminal, and the login of the account can only be implemented on the second terminal in a case in which the user normally logs in by using the first terminal. Therefore, even though an account is stolen, an account thief can log into the account only by using a trusted device, which adds a barrier to prevent logins and frauds of the account thief by using the account, thereby improving security. Further, in a manner of scanning a two-dimensional code, the user no longer needs to input information, such as an account, again by using the second terminal, which reduces the process of operation and improves the convenience of operations. Moreover, after scanning a two-dimensional code, the first terminal uploads an account and a unique random number. Compared with a manner of uploading an account and a password during a login in the conventional technology, because there is no need to upload a password, the probability that a password is intercepted is lowered, and security is further improved.

Figure 4:
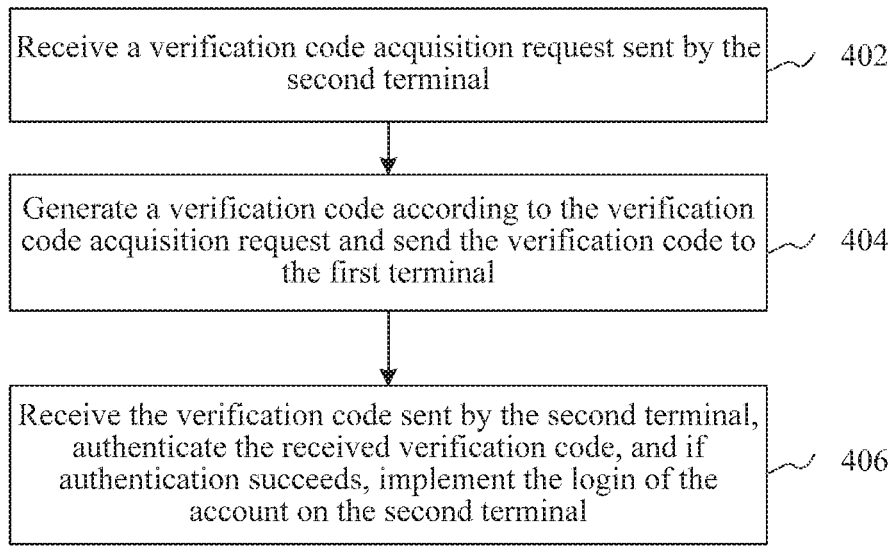
FIG. 4 is a flowchart of implementing a login of an account on a second terminal by using a first terminal according to various embodiments.

In various embodiments, as shown in FIG. 4, the block of implementing a login of the account on the second terminal by using a first terminal corresponding to the first terminal identifier in block 208 includes the following.

Block 402: Receive a verification code acquisition request sent by the second terminal.

Block 404: Generate a verification code according to the verification code acquisition request and send the verification code to the first terminal.

Block 406: Receive the verification code sent by the second terminal, authenticate the received verification code, and if authentication succeeds, implement the login of the account on the second terminal. In various embodiments, when the server detects that the device lock flag corresponding to the account is unlocked, and the device lock is locked on the second terminal requesting a login (that is, the second terminal is an untrusted device), prompt information is sent to the second terminal, so as to prompt the user using the second terminal to acquire the verification code. Further, an interface element, for example, a button and a menu item, for prompting the user to acquire the verification code may be displayed on the second terminal. The second terminal acquires a request from the user to acquire the verification code, and forwards the request to the server. The server automatically generates the verification code, where the verification code may be a random number, and then sends the verification code to the first terminal according to the first terminal identifier. For example, the first terminal is a smartphone, and the verification code may be sent to the first terminal in a manner of a short message service message. The user receives the verification code by using the first terminal, and then inputs the verification code by using the second terminal. The second terminal uploads the input verification code to the server. The server receives the verification code, determines whether the verification code is the same as the verification code generated before. If the verification code is the same as the verification code generated before, the login of the account on the second terminal is implemented, and for example, the state corresponding to the account on the second terminal is changed to a logged-in state.

In various embodiments, a login of an account can only be implemented on a second terminal when a user receives a verification code by using a first terminal and inputs the verification code and uploads the verification code to a server by using the second terminal, which ensures that a user using the second terminal is a user using the first terminal. Therefore, even though an account is stolen, an account thief can only log into the account by using a trusted device, which adds a barrier to prevent logins and frauds of the account thief by using the account, thereby improving security.

In various embodiments, before the receipt of a login request command sent by a second terminal, the method further includes receiving a device lock unlocking command sent by the first terminal, the device lock unlocking command carrying the account and the first terminal identifier, and setting the device lock flag corresponding to the account to be unlocked, establishing the correspondence between the account and the first terminal identifier, and setting the state corresponding to the first terminal identifier to be that the device lock is unlocked.

In various embodiments, the first terminal may first log into an application program by using the account and set, by using an interface provided by the application program, that the device lock is unlocked, so that the device lock unlocking command, the account, and the first terminal identifier may be sent to the server. The server establishes the correspondence between the account and the first terminal identifier, sets the device lock flag corresponding to the account to be unlocked, indicating that the device lock is unlocked for the account, and sets the state corresponding to the first terminal identifier to be that the device lock is unlocked, indicating that the first terminal is the trusted device. It may be understood that correspondences may exist between one account and multiple first terminal identifiers, that is, a same account may have multiple trusted devices, and the device lock is unlocked on the first terminal used as the trusted device.

In various embodiments, the account login method further includes receiving a device lock deletion command, the device lock deletion command carrying the account and the first terminal identifier, and changing the state corresponding to the first terminal identifier to that the device lock is locked. In various embodiments, all first terminals on which a device lock is unlocked can be deleted on any first terminal, that is, the first terminal identifier carried in the device lock deletion command refers to a first terminal identifier of which the state needs to be correspondingly changed to that the device lock is locked. Therefore, it will be understood by those skilled in the art that the first terminal identifier carried in the device lock deletion command received by the server may be not a first terminal identifier for sending the device lock deletion command.

In various embodiments, the account login method further includes receiving a device lock locking command, the device lock locking command carrying the account, and changing the device lock flag corresponding to the account to be locked. In various embodiments, a device lock may be selected to be locked on any first terminal, and as long as a server receives a device lock locking command, the server changes a device lock flag corresponding to the carried account to be locked. Next, when the account is logged into any terminal, a login may be directly performed without authentication by the trusted device.

Figure 5:
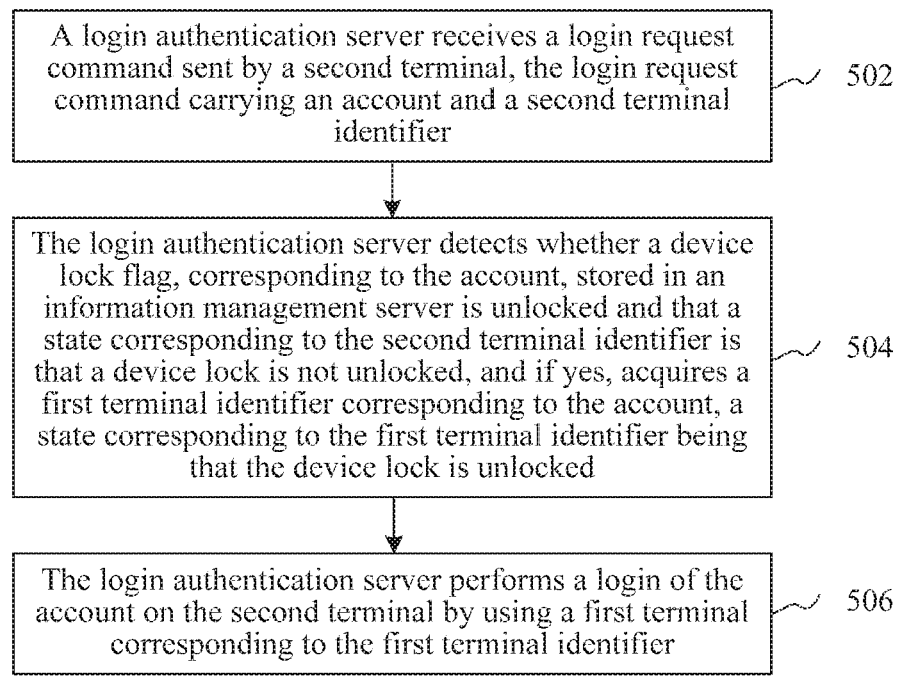
FIG. 5 is a flowchart of an account login method according to various embodiments.

As shown in FIG. 5, in various embodiments, another account login method is further provided, description is made by using an example in which the method is applied to a server side, and the method includes the following.

Block 502: A login authentication server receives a login request command sent by a second terminal, the login request command carrying an account and a second terminal identifier.

Block 504: The login authentication server detects whether a device lock flag, corresponding to the account, stored in an information management server is unlocked and that a state corresponding to the second terminal identifier is that a device lock is locked. If yes, acquires a first terminal identifier corresponding to the account, a state corresponding to the first terminal identifier being that the device lock is unlocked.

Block 506: The login authentication server implements a login of the account on the second terminal by using a first terminal corresponding to the first terminal identifier.

In various embodiments, the login authentication server is a server configured to perform account login authentication, and the information management server is a server configured to manage device lock information. The information management server stores the account and the corresponding device lock flag, a correspondence between the account and the first terminal identifier/the second terminal identifier, and the state corresponding to the first terminal identifier/the second terminal identifier. The device lock flag includes two states, unlocked and locked. The device lock flag is unlocked, indicating that the device lock is unlocked for a corresponding account, and in contrast, the device lock flag is locked, indicating that the device lock is locked for the account. The first terminal corresponding to the first terminal identifier refers to a terminal on which the device lock is unlocked, and the information management server stores correspondences between the account and multiple first terminal identifiers. The second terminal is a terminal on which the device lock is locked. A terminal identifier is used for uniquely identifying a terminal. For different types of terminals, terminal identifiers of the terminals may differ. For example, for a smartphone, a terminal identifier may be a character string formed by information, such as a mobile number, a MAC address, and an IMEI. For a PC, a terminal identifier may be a character string formed by information, such as a MAC address and a hard disk sequence number. The terminal identifier is not limited to the two forms, as long as the terminal identifier can uniquely identify a terminal.

A device lock is used for locking an account by using a device, the first terminal on which the device lock is unlocked refers to a trusted device, and the second terminal on which the device lock is locked refers to an untrusted device. The same application program may run on the first terminal and the second terminal, that is, an application program may be logged into the first terminal by using an account and the application program may also be logged into the second terminal by using the account. For example, the same instant messaging software may be logged into the first terminal, and may be logged into the second terminal by using a same account.

In various embodiments, the first terminal logs into the application program by using the account, and the device lock is unlocked. Therefore, the device lock flag corresponding to the account is unlocked. When the second terminal logs into a same application program by using the account or in a webpage manner, the login authentication server needs to detect the account. The login authentication server performs detection in the information management server, and when the login authentication server detects that the device lock flag, corresponding to the account, stored in the information management server is unlocked and the state corresponding to the second terminal identifier is that the device lock is locked, it indicates that the account is locked by a device and the second terminal requesting a login is not an trusted device, and the first terminal identifier that corresponds to the account and whose state is that the device lock is unlocked is acquired from the information management server, so as to implement the login of the account on the second terminal by using the first terminal that is used as the trusted device. It may be that the first terminal participates in an authentication process of the second terminal, so as to ensure that a user using the second terminal is also a user using the first terminal.

In various embodiments, implementing, by the login authentication server, the login of the account on the second terminal by using a first terminal corresponding to the first terminal identifier includes generating, by the login authentication server, a two-dimensional code and sending the two-dimensional code to the second terminal for displaying; receiving, by the login authentication server, a scan command from the first terminal on the two-dimensional code, the scan command carrying the account; and implementing, by the login authentication server, the login of the account on the second terminal according to the scan command.

In various embodiments, implementing, by the login authentication server, a login of the account on the second terminal by using a first terminal corresponding to the first terminal identifier includes receiving, by the login authentication server, a verification code acquisition request sent by the second terminal, generating, by the login authentication server, a verification code according to the verification code acquisition request and sending the verification code to the first terminal, and receiving, by the login authentication server, the verification code sent by the second terminal, authenticating the received verification code, and if authentication succeeds, implementing the login of the account on the second terminal.

In various embodiments, before receiving, by a login authentication server, a login request command sent by a second terminal, the account login method further includes receiving, by the information management server, a device lock unlocking command sent by the first terminal, the device lock unlocking command carrying the account and the first terminal identifier; and setting, by the information management server, the device lock flag corresponding to the account to be unlocked, establishing a correspondence between the account and the first terminal identifier, and setting the state corresponding to the first terminal identifier to be that the device lock is unlocked.

A process of the account login method in the various embodiments is described below in detail by using an example in which the first terminal is a mobile phone and the second terminal is a PC.

Figure 6:
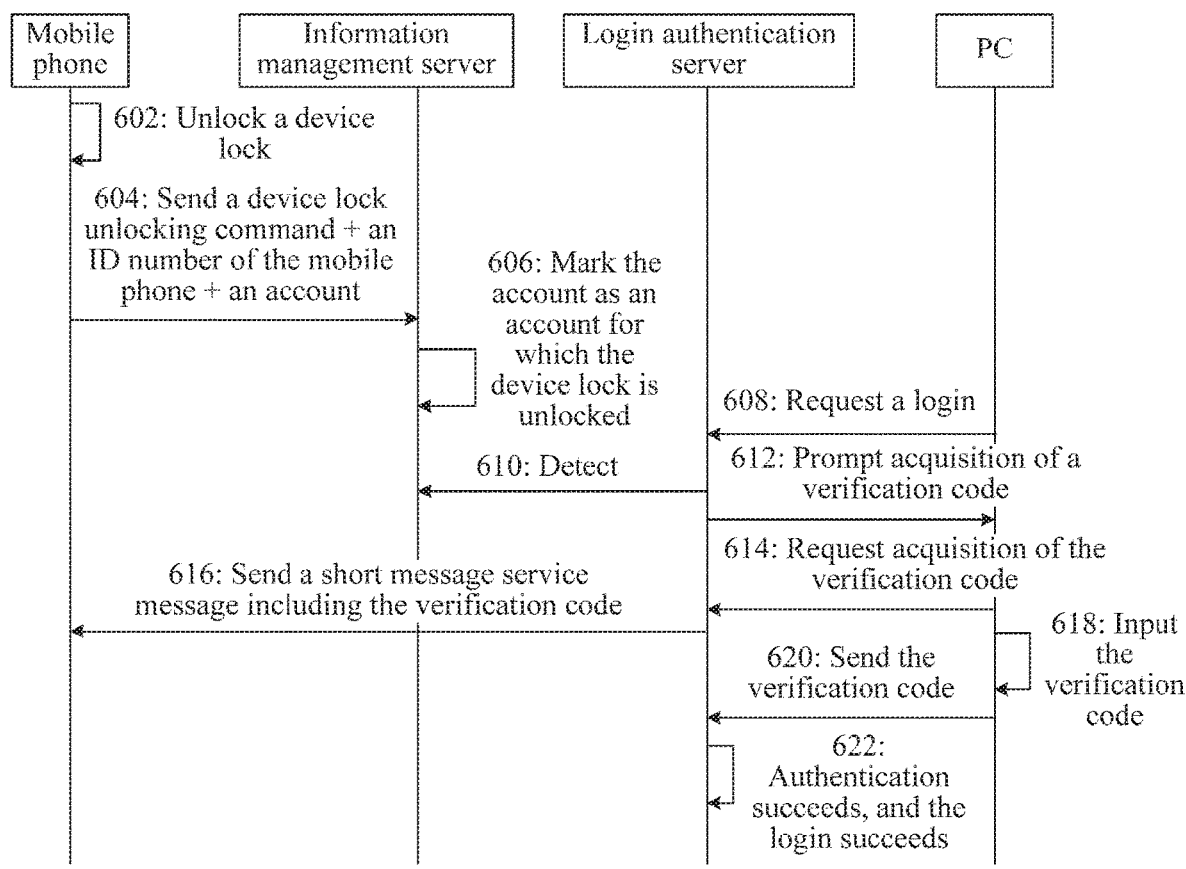
FIG. 6 is a timing diagram of an account login method according to various embodiments.
Figure 8:
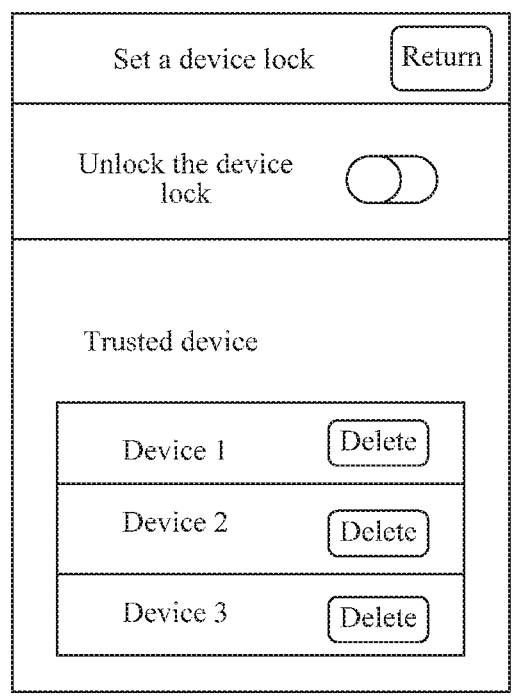
FIG. 8 is a diagram of setting an interface of a device lock according to various embodiments.

As shown in FIG. 6, in various embodiments, the process of an account login method is as follows:

Block 602: Unlock a device lock on a mobile phone. An interface for setting the device lock is shown in FIG. 8. The mobile phone logs into an account to enter an application program, and selects to unlock or lock the device lock by using a control (such as a slider in FIG. 8) on an interface provided by the application program.

Block 604: The mobile phone sends a device lock unlocking command, an ID number of the mobile phone, and an account to an information management server. The ID number of the mobile phone may be a character string formed by information, such as a mobile number, a MAC address, and an IMEI. The account may be directly acquired by using an application program that is logged into.

Block 606: The information management server marks the account as an account for which the device lock is unlocked. The information management server sets a device lock flag corresponding to the account to be unlocked, the account corresponds to the ID number of the mobile phone, and a state corresponding to the ID number of the mobile phone is set to be that the device lock is unlocked, that is, the mobile phone is a trusted device corresponding to the account.

Block 608: The PC makes a login request to the login authentication server. The PC sends a login request command, an account to which a login is requested, and an ID number of the PC to the login authentication server.

Block 610: The login authentication server performs detection in the information management server.

Block 612: Prompt the PC to acquire a verification code. The login authentication server detects in the information management server that a device lock flag corresponding to an account to which a login is requested by the PC is unlocked, and that a state of the PC is that the device lock is locked, prompt information is sent to the PC, and an interface element for prompting the user to acquire the verification code is displayed on the PC.

Block 614: The PC requests acquisition of the verification code from the login authentication server.

Block 616: The login authentication server sends a short message service message including the verification code to the mobile phone. The login authentication server acquires the ID number, which corresponds to the account to which a login is requested by the PC, of the mobile phone, and sends the short message service message including the verification code to the mobile phone.

Block 618: The PC inputs the verification code. If a user using the mobile phone is a user using the PC, after the mobile phone receives the short message service message including the verification code, the user checks the verification code and inputs the verification code to the PC.

Block 620: The PC sends the verification code to the login authentication server.

Block 622: The login authentication server authenticates the received verification code, if the verification code is the same as the verification code generated before, authentication succeeds, and the account is successfully logged into the PC.

Figure 7:
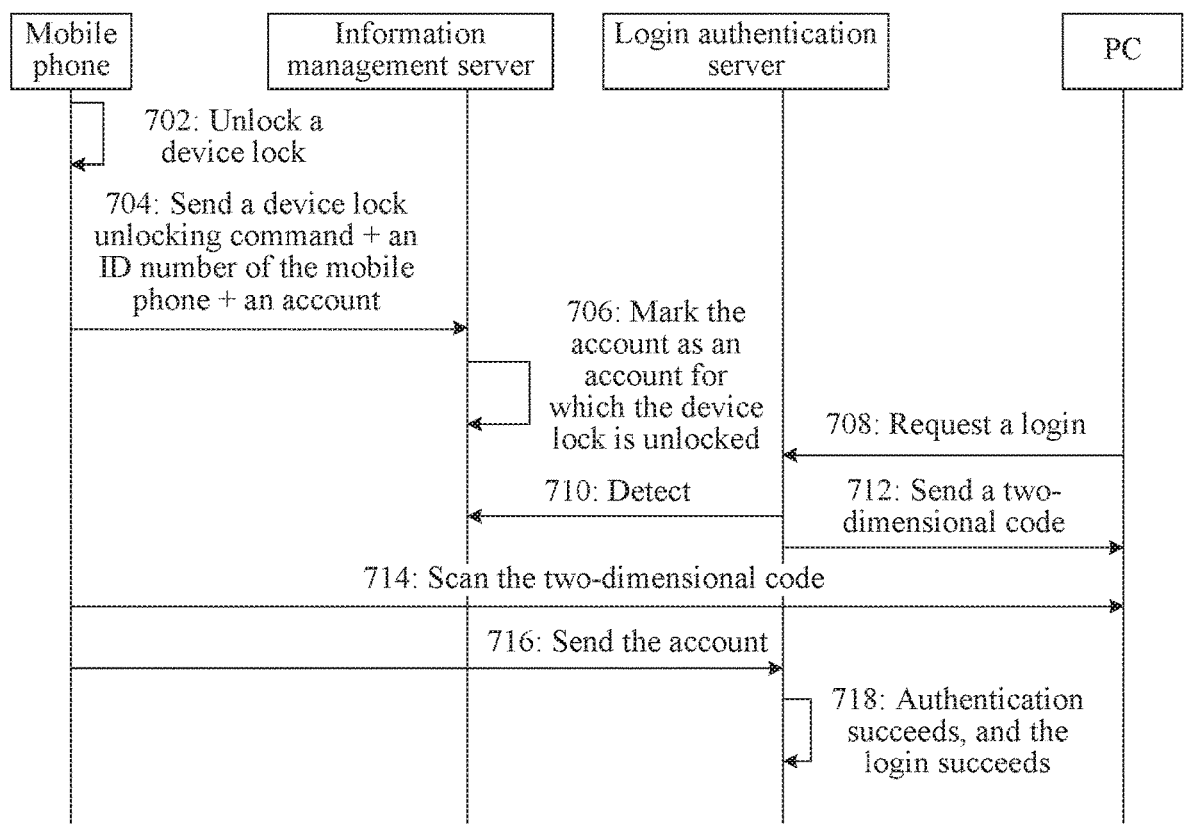
FIG. 7 is a timing diagram of an account login method according to various embodiments.

As shown in FIG. 7, in various embodiments, the process of an account login method is as follows.

Block 702: A mobile phone unlocks a device lock.

Block 704: The mobile phone sends a device lock unlocking command, an ID number of the mobile phone, and an account to an information management server.

Block 706: The information management server marks the account as an account for which the device lock is unlocked.

Block 708: A PC requests a login to the account.

Block 710: A login authentication server performs detection in the information management server.

The process of block 702 to block 710 is the same as the process in the various embodiments shown in FIG. 6, and is not described herein again.

Block 712: The login authentication server sends a two-dimensional code. When detecting in the information management server that a device lock flag corresponding to an account to which a login is requested by the PC is unlocked, and that a state of the PC is that the device lock is locked, the login authentication server automatically generates a unique random number, and generates the two-dimensional code according to the unique random number, and sends the two-dimensional code to the PC for displaying.

Block 714: The mobile phone scans the two-dimensional code displayed on the PC. The mobile phone logs into an application program by using the account, and starts scanning of the two-dimensional code by using a two-dimensional code scanning interface provided by the application program.

Block 716: The mobile phone sends the account to the login authentication server. The two-dimensional code displayed on the PC is collected by using an image collection apparatus of the mobile phone, the two-dimensional code is parsed to obtain a unique random number, and the unique random number and the account for logging into the application program are sent to the login authentication server together.

Block 718: The login authentication server succeeds in authentication, and a login succeeds. The login authentication server receives the unique random number and the account, determines whether the received unique random number is the same as the unique random number generated before, and if the received unique random number is the same as the unique random number generated before, implements a login of the account on the PC.

In various embodiments, the account login method further includes receiving, by the information management server, a device lock deletion command, the device lock deletion command carrying the account and a first terminal identifier, and changing a state corresponding to the first terminal identifier to that the device lock is locked. In various embodiments, the account login method further includes receiving, by the information management server, a device lock locking command, the device lock locking command carrying the account, and changing the device lock flag corresponding to the account to be locked.

As shown in FIG. 8, it may be selected to lock a device lock on any trusted device and/or delete a trusted device. In various embodiments, a first terminal is a trusted device, and the first terminal logs into an application program by using an account to enter an interface for setting a device lock (as shown in FIG. 8). Correspondences between all first terminal identifiers and the account, and a list of trusted devices on which a device lock is unlocked can be displayed on the interface. The list includes a device name of the trusted device and a corresponding deleting button. When a user selects to lock the device lock on the interface, in the information management server, a state of the device lock corresponding to the stored account is changed to be locked. When the user selects to delete a trusted device on the interface, in the information management server, a state corresponding to the first terminal identifier corresponding to the trusted device is changed to that the device lock is locked.

Figure 9:
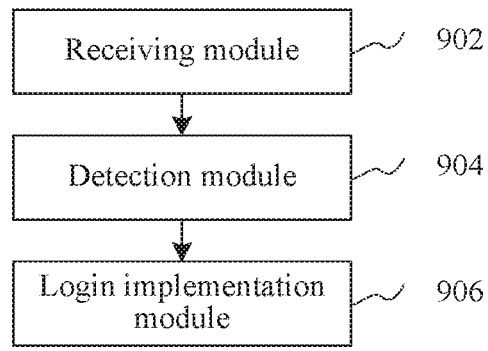
FIG. 9 is a block diagram of an account login apparatus according to various embodiments.

Referring to FIG. 9, in various embodiments, an account login apparatus is further provided, including a receiving module 902, a detection module 904, and a login implementation module 906.

The receiving module 902 is configured to receive a login request command sent by a second terminal, the login request command carrying an account and a second terminal identifier.

The detection module 904 is configured to detect the login request command, the login request command carrying the account and the second terminal identifier.

The login implementation module 906 is configured to acquire, if a device lock flag corresponding to the account is unlocked and a state corresponding to the second terminal identifier is that a device lock is locked, a first terminal identifier corresponding to the account, a state corresponding to the first terminal identifier being that the device lock is unlocked, and implement a login of the account on the second terminal by using a first terminal corresponding to the first terminal identifier.

In various embodiments, if the device lock flag corresponding to the account is unlocked and the state corresponding to the second terminal identifier is that the device lock is locked, the first terminal identifier corresponding to the account is acquired, the state corresponding to the first terminal identifier being that the device lock is unlocked, and the login of the account is implemented on the second terminal by using the first terminal corresponding to the first terminal identifier. The login implementation module 906 is configured to enable the first terminal to participate in an authentication process of the second terminal, so as to ensure that a user using the second terminal is also a user using the first terminal.

Figure 10:
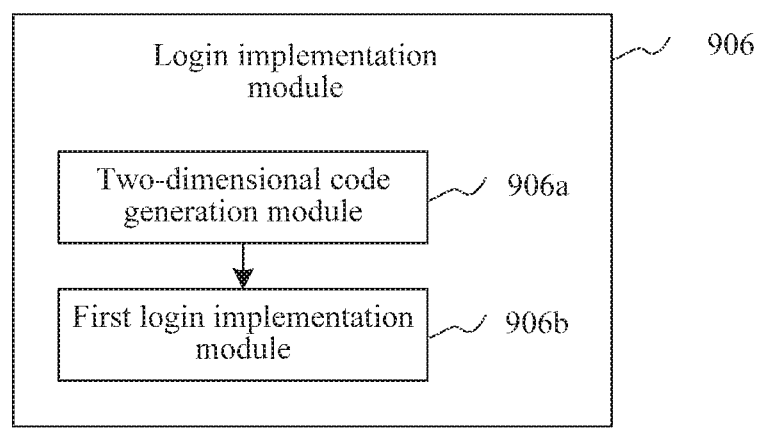
FIG. 10 is a block diagram of a login implementation module according to various embodiments.

In various embodiments, as shown in FIG. 10, the login implementation module 906 includes:

a two-dimensional code generation module 906*a*, configured to generate a two-dimensional code and send the two-dimensional code to the second terminal for displaying; and a first login implementation module 906*b*, configured to receive a scan command from the first terminal on the two-dimensional code, the scan command carrying the account, and implement the login of the account on the second terminal according to the scan command.

In various embodiments, when the detection module 904 detects that the device lock flag corresponding to the account is unlocked, and the device lock is locked on the second terminal requesting a login (that is, the second terminal is an untrusted device), the two-dimensional code is generated, and the two-dimensional code stores an automatically generated unique random number (key). The two-dimensional code is sent to the second terminal, and is displayed on the second terminal by using a login interface.

Further, the first terminal needs to first log in by using the account, and when scanning the two-dimensional code displayed on the second terminal, the first terminal can acquire the account and send the account and the scan command to the server together. The first terminal logs into an application program by using the account, starts scanning of the two-dimensional code by using the application program, collects a two-dimensional code image displayed on the second terminal, and obtains a unique random number in the two-dimensional code image by scanning. The first terminal sends the obtained unique random number and the account to the first login implementation module 906*b* together. The first login implementation module 906*b* is configured to detect whether the received unique random number is the same as the unique random number that was automatically generated before. If the received unique random number is the same as the unique random number that was automatically generated before, authentication succeeds, and the second terminal successfully logs in by using the account.

Figure 11:
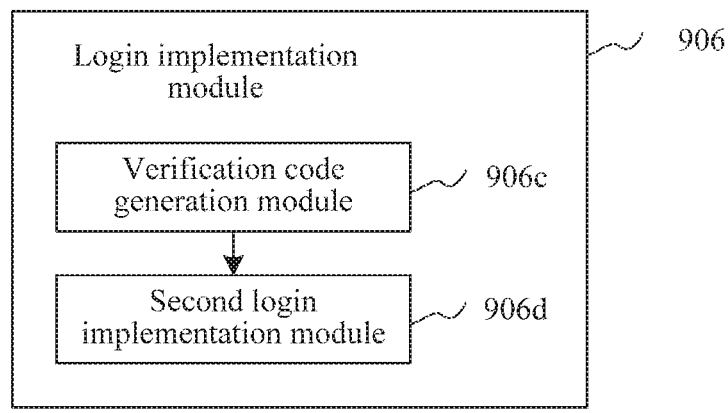
FIG. 11 is a block diagram of a login implementation module according to various embodiments.

In various embodiments, as shown in FIG. 11, the login implementation module 906*b* includes:

a verification code generation module 906*c*, configured to receive a verification code acquisition request sent by the second terminal, generate a verification code according to the verification code acquisition request, and send the verification code to the first terminal;

a second login implementation module 906*d*, configured to generate the verification code according to the verification code acquisition request and send the verification code to the first terminal.

In various embodiments, when the detection module 904 detects that the device lock flag corresponding to the account is unlocked, and the device lock is locked on the second terminal requesting a login (that is, the second terminal is an untrusted device), prompt information is sent to the second terminal, so as to prompt the user using the second terminal to acquire the verification code. Further, an interface element, for example, a button and a menu item, for prompting the user to acquire the verification code may be displayed on the second terminal. The second terminal acquires a request of the user to acquire the verification code, and forwards the request to the verification code generation module 906c. The verification code generation module 906c automatically generates the verification code, where the verification code may be a random number, and then sends the verification code to the first terminal according to the first terminal identifier. For example, the first terminal is a smartphone, and the verification code may be sent to the first terminal in a manner of a short message service message. The user receives the verification code by using the first terminal, and then inputs the verification code by using the second terminal. The second terminal uploads the input verification code to the second login implementation module 906d. The second login implementation module 906d is configured to receive the verification code, determine whether the verification code is the same as the verification code generated before, and if the verification code is the same as the verification code generated before, implement the login of the account on the second terminal, for example, change the state corresponding to the account on the second terminal to a logged-in state.

Figure 12:
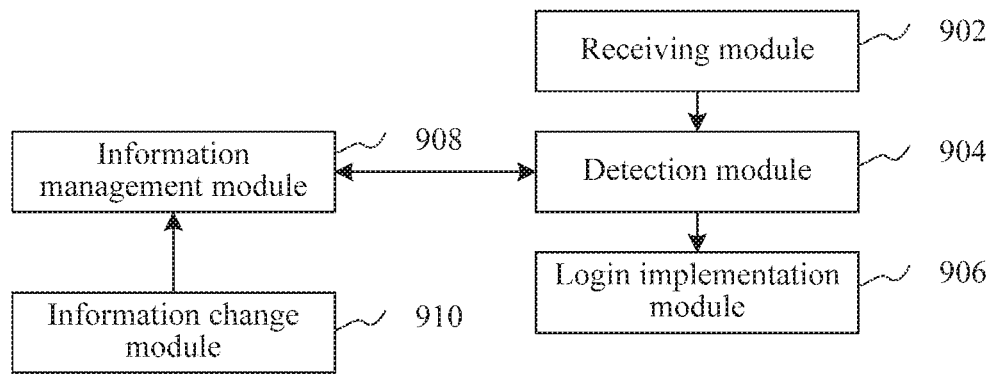
FIG. 12 is a block diagram of an account login apparatus according to various embodiments.

In various embodiments, as shown in FIG. 12, the account login apparatus further includes an information management module 908 and an information change module 910, where:

the information management module 908 is configured to receive a device lock unlocking command sent by the first terminal, the device lock unlocking command carrying the account and the first terminal identifier; and set the device lock flag corresponding to the account to be unlocked, establish a correspondence between the account and the first terminal identifier, and set the state corresponding to the first terminal identifier to be that the device lock is unlocked;

the information change module 910 is configured to receive a device lock deletion command, the device lock deletion command carrying the account and the first terminal identifier, and change the state corresponding to the first terminal identifier to that the device lock is locked; and/or the information change module 910 is configured to receive a device lock locking command, the device lock locking command carrying the account; and change the device lock flag corresponding to the account to be locked.

Figure 13:
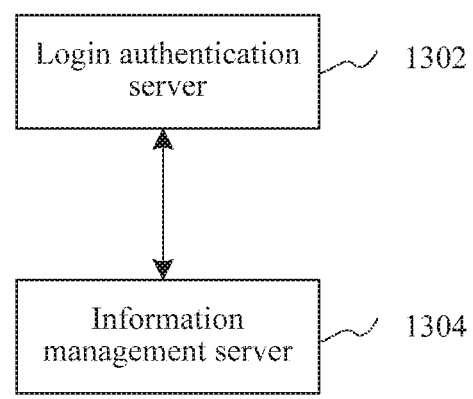
FIG. 13 is a block diagram of an account login system according to various embodiments.

As shown in FIG. 13, in various embodiments, an account login system is further provided, including a login authentication server 1302 and an information management server 1304.

The login authentication server 1302 is configured to receive a login request command sent by a second terminal, the login request command carrying an account and a second terminal identifier.

The information management server 1304 is configured to store a device lock flag corresponding to the account, a state corresponding to the second terminal identifier, and a state corresponding to a first terminal identifier.

In various embodiments, the login authentication server 1302 is further configured to detect whether the device lock flag, corresponding to the account, stored in the information management server 1304 is unlocked and that the state corresponding to the second terminal identifier is that a device lock is locked. If yes, acquire the first terminal identifier corresponding to the account, the state corresponding to the first terminal identifier being that the device lock is unlocked.

The login authentication server 1302 is further configured to implement a login of the account on the second terminal by using a first terminal corresponding to the first terminal identifier. In various embodiments, the login authentication server 1302 is further configured to generate a two-dimensional code and send the two-dimensional code to the second terminal for displaying, receive a scan command from the first terminal on the two-dimensional code, the scan command carrying the account, and implement the login of the account on the second terminal according to the scan command. In various embodiments, the login authentication server 1302 is further configured to receive a verification code acquisition request sent by the second terminal; generate a verification code according to the verification code acquisition request and send the verification code to the first terminal; and receive the verification code sent by the second terminal, authenticate the received verification code, and if authentication succeeds, implement the login of the account on the second terminal.

In various embodiments, the information management server 1304 is further configured to receive a device lock unlocking command sent by the first terminal, the device lock unlocking command carrying the account and the first terminal identifier; and set the device lock flag corresponding to the account to be unlocked, establish a correspondence between the account and the first terminal identifier, and set the state corresponding to the first terminal identifier to be that the device lock is unlocked. In various embodiments, the information management server 1304 is further configured to receive a device lock deletion command, the device lock deletion command carrying the account and the first terminal identifier, and change the state corresponding to the first terminal identifier to that the device lock is locked. In various embodiments, the information management server 1304 is further configured to receive a device lock locking command, the device lock locking command carrying the account, and change the device lock flag corresponding to the account to be locked.

Those of ordinary skill in the art will understand that all or a part of the processes in the method according to the embodiments may be implemented by a computer program instructing relevant hardware. The program may be stored in a computer readable storage medium. When the program is run, the processes of the method according to the embodiments are performed. The storage medium may be a magnetic disk, an optical disc, a read-only memory (ROM) or a random access memory (RAM).

The foregoing embodiments describe several implementation manners of the present disclosure, and their description is detailed, but cannot therefore be understood as a limitation to the patent scope of the present disclosure. It should be noted that a person of ordinary skill in the art may further make variations and improvements without departing from the concept of the present disclosure, and these all fall within the protection scope of the present disclosure. Therefore, the patent protection scope of the present disclosure should be subject to the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more blocks within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An account login method, comprising:
receiving a login request command sent by a second terminal, the login request command carrying an account used for logging into an application program and a second terminal identifier of the second terminal;
obtaining a preset device lock flag associated with the account and a preset state of the second terminal identifier associated with the account, wherein a device lock corresponding to the device lock flag is used for locking the account by using a device;
in response to a determination that the device lock flag is unlocked and that the state of the second terminal identifier indicates the second terminal is locked according to a corresponding relationship between the device lock flag and the account, a corresponding relationship between the account and terminal identifiers, and a corresponding relationship between a state and each of the terminal identifiers, acquiring, from preset terminal identifiers associated with the account, a first terminal identifier of a first terminal whose preset state indicates the first terminal is unlocked, wherein the first terminal on which the device lock is unlocked refers to a trusted device, and the second terminal on which the device is locked refers to an untrusted device;
generating a random first verification code and sending the random first verification code to the first terminal via a short message service (SMS) message for displaying;
receiving a second verification code submitted by the second terminal; and
implementing a login of the account on the second terminal in response to a determination that the second verification code is consistent with the random first verification code.

2. The method according to claim 1, wherein generating the random first verification code and sending the random first verification code to the first terminal comprises:
in response to reception of a verification code acquisition request sent by the second terminal, generating the random first verification code and sending the random first verification code to the first terminal.

3. The method according to claim 1, wherein generating the random first verification code and sending the random first verification code to the first terminal comprises:
in response to reception of the login request command sent by the second terminal, generating the random first verification code and sending the random first verification code to the first terminal.

4. The method according to claim 1, further comprising:
in response to reception of a device lock unlocking command sent by the first terminal, the device lock unlocking command carrying the account and the first terminal identifier,
setting the device lock flag associated with the account to be unlocked, associating the account with the first terminal identifier, and setting the state of the first terminal identifier to indicate the first terminal is unlocked.

5. The method according to claim 1, further comprising:
in response to reception of a device lock deletion command, the device lock deletion command carrying the account and the first terminal identifier,
changing the state of the first terminal identifier to indicate the first terminal is locked.

6. The method according to claim 1, further comprising:
in response to reception of a device lock locking command, the device lock locking command carrying the account,
changing the device lock flag corresponding to the account to be locked.

7. The method according to claim 1, further comprising:
sending information about the first terminal identifier associated with the account to the first terminal for displaying;
in response to reception of a locking command triggered by an operation on displayed information about a third terminal identifier of a third terminal, modifying a state of the third terminal to indicate the third terminal is locked; and
in response to reception of an unlocking command triggered by an operation on displayed information about a fourth terminal identifier of a fourth terminal, modifying a state of the fourth terminal to indicate the fourth terminal is unlocked.

8. An apparatus, comprising:
a processor and a memory;
wherein the memory stores computer-readable instructions executable by the processor to:
receive a login request command sent by a second terminal, the login request command carrying an account used for logging into an application program and a second terminal identifier of the second terminal;
obtain a preset device lock flag associated with the account and a preset state of the second terminal identifier associated with the account, wherein a device lock corresponding to the device lock flag is used for locking the account by using a device;
in response to a determination that the device lock flag is unlocked and that the state of the second terminal identifier indicates the second terminal is locked according to a corresponding relationship between the device lock flag and the account, a corresponding relationship between the account and terminal identifiers, and a corresponding relationship between a state and each of the terminal identifiers, acquire, from preset terminal identifiers associated with the account, a first terminal identifier of a first terminal whose preset state indicates the first terminal is unlocked, wherein the first terminal on which the device lock is unlocked refers to a trusted device, and the second terminal on which the device lock is locked refers to an untrusted device;
generate a random first verification code and send the random first verification code to the first terminal via a short message service (SMS) message for displaying;
receive a second verification code submitted by the second terminal; and
implement a login of the account on the second terminal in response to a determination that the second verification code is consistent with the random first verification code.

9. The apparatus according to claim 8, wherein the instructions are executable by the processor to:
in response to reception of a verification code acquisition request sent by the second terminal, generating the random first verification code and sending the random first verification code to the first terminal.

10. The apparatus according to claim 8, wherein the instructions are executable by the processor to:
in response to reception of the login request command sent by the second terminal, generating the random first verification code and sending the random first verification code to the first terminal.

11. The apparatus according to claim 8, wherein the instructions are executable by the processor to:
in response to reception of a device lock unlocking command sent by the first terminal, the device lock unlocking command carrying the account and the first terminal identifier,
setting the device lock flag associated with the account to be unlocked, associating the account with the first terminal identifier, and setting the state of the first terminal identifier to indicate the first terminal is unlocked.

12. The apparatus according to claim 8, wherein the instructions are executable by the processor to:
in response to reception of a device lock deletion command, the device lock deletion command carrying the account and the first terminal identifier,
changing the state of the first terminal identifier to indicate the first terminal is locked.

13. The apparatus according to claim 8, wherein the instructions are executable by the processor to:
in response to reception of a device lock locking command, the device lock locking command carrying the account,
changing the device lock flag corresponding to the account to be locked.

14. The apparatus according to claim 8, wherein the instructions are executable by the processor to:
sending information about the first terminal identifier associated with the account to the first terminal for displaying;
in response to reception of a locking command triggered by an operation on displayed information about a third terminal identifier of a third terminal, modifying a state of the third terminal to indicate the third terminal is locked; and
in response to reception of an unlocking command triggered by an operation on displayed information about a fourth terminal identifier of a fourth terminal, modifying a state of the fourth terminal to indicate the fourth terminal is unlocked.

15. A non-transitory computer-readable storage medium, comprising: computer-readable instructions executable by a processor to:
a processor and a memory;
wherein the memory stores computer-readable instructions executable by the processor to:
receive a login request command sent by a second terminal, the login request command carrying an account used for logging into an application program and a second terminal identifier of the second terminal;
obtain a preset device lock flag associated with the account and a preset state of the second terminal identifier associated with the account, wherein a device lock corresponding to the device lock flag is used for locking the account by using a device;
in response to a determination that the device lock flag is unlocked and that the state of the second terminal identifier indicates the second terminal is locked according to a corresponding relationship between the device lock flag and the account, a corresponding relationship between the account and terminal identifiers, and a corresponding relationship between a state and each of the terminal identifiers, acquire, from preset terminal identifiers associated with the account, a first terminal identifier of a first terminal whose preset state indicates the first terminal is unlocked, wherein the first terminal on which the device lock is unlocked refers to a trusted device, and the second terminal on which the device lock is locked refers to an untrusted device;
generate a random first verification code and send the random first verification code to the first terminal via a short message service (SMS) message for displaying;
receive a second verification code submitted by the second terminal; and
implement a login of the account on the second terminal in response to a determination that the second verification code is consistent with the random first verification code.

* * * * *